(12) United States Patent
Stoner et al.

(10) Patent No.: US 11,712,990 B2
(45) Date of Patent: Aug. 1, 2023

(54) FOOT REST ASSEMBLY FOR SEAT OF A MOTORIZED VEHICLE

(71) Applicant: The Braun Corporation, Winamac, IN (US)

(72) Inventors: James Stoner, Star City, IN (US); Michael T. Zindler, Kalamazoo, MI (US)

(73) Assignee: Ths Braun Corporation, Winamac, IN (US)

( * ) Notice: Subject to any disclaimer, the term of this patent is extended or adjusted under 35 U.S.C. 154(b) by 0 days.

(21) Appl. No.: 17/846,411

(22) Filed: Jun. 22, 2022

(65) Prior Publication Data

US 2022/0314859 A1   Oct. 6, 2022

Related U.S. Application Data

(63) Continuation of application No. 17/142,383, filed on Jan. 6, 2021, now Pat. No. 11,400,846.

(60) Provisional application No. 62/957,836, filed on Jan. 7, 2020.

(51) Int. Cl.
   *B60N 3/06* (2006.01)

(52) U.S. Cl.
   CPC .................................. *B60N 3/063* (2013.01)

(58) Field of Classification Search
   CPC .......... B60N 3/06; B60N 3/063; B60N 2/995
   USPC ......................................................... 296/75
   See application file for complete search history.

(56) References Cited

U.S. PATENT DOCUMENTS

| | | | | |
|---|---|---|---|---|
| 1,544,258 A | * | 6/1925 | McMaster | B60N 3/063 296/75 |
| 3,710,962 A | * | 1/1973 | Fowler, Jr. | A61G 3/062 414/545 |
| 5,308,214 A | | 5/1994 | Crain et al. | |
| 6,270,140 B1 | * | 8/2001 | Opfer | B60N 2/3011 296/65.09 |
| 8,763,954 B2 | | 7/2014 | Rajasingham | |
| 9,403,597 B2 | | 8/2016 | Ferry et al. | |
| 10,442,316 B2 | | 10/2019 | Ahn et al. | |

(Continued)

FOREIGN PATENT DOCUMENTS

| CN | 208827836 U | 5/2019 |
|---|---|---|
| DE | 202006005981 U | 6/2006 |

(Continued)

OTHER PUBLICATIONS

English Translation of Japanese Patent Document H02-405765 (Year: 1992).*

(Continued)

*Primary Examiner* — Jason S Morrow
*Assistant Examiner* — Wenwei Zhuo
(74) *Attorney, Agent, or Firm* — Daniel Tallitsch

(57) ABSTRACT

A foot rest assembly includes a foot rest member movable between a stowed position and a deployed position. The assembly further includes a leg having a first leg end coupled to the foot rest member and a second leg end, and an arm assembly including a flange and a track. The track includes a first track end and a second track end. A bearing assembly is coupled to the second leg end of the leg. In the deployed position, the bearing assembly and second leg end are located at the first end of the track. In the stowed position, the bearing assembly and second leg end are located at the second end of the track.

19 Claims, 10 Drawing Sheets

(56) References Cited

U.S. PATENT DOCUMENTS

2018/0050671 A1* 2/2018 Yahagi ............... B60N 3/06
2022/0396186 A1* 12/2022 Salter et al. ......... B60N 2/3095
                                                    296/64

FOREIGN PATENT DOCUMENTS

| DE | 102010041647 A1 | 3/2012 | | |
|---|---|---|---|---|
| JP | H0492445 U | 3/1992 | | |
| JP | 10315828 A * | 12/1998 | | |
| JP | H10315828 A | 12/1998 | | |
| JP | 2018127169 A * | 8/2018 | ............... | B60N 2/22 |
| KR | 19980041848 U | 8/1998 | | |
| KR | 101399896 B | 5/2014 | | |
| WO | WO 2018037877 A1 * | 3/2018 | ............... | B60N 3/06 |

OTHER PUBLICATIONS

English Translation of Japanese Patent Document H10-315828 (Year: 1998).*
Nakamura et al. WO2018037877A1, "Footrest device for ottoman", machine translation, ip.com, Mar. 1, 2018 (Year: 2018).*
Minato et al. JP2018127169A, "Vehicle seat control system, vehicle seat control method, and program", machine translation, ip.com, Aug. 16, 2018 (Year: 2018).*
International Search Report and Written Opinion of the International Searching Authority, Korean Intellectual Property Office, International Patent Application No. PCT/US2021/012243, dated May 4, 2021.

* cited by examiner

FOOT REST ASSEMBLY FOR SEAT OF A MOTORIZED VEHICLE

RELATED APPLICATIONS

This application is a continuation of U.S. patent application Ser. No. 17/142,383, filed Jan. 6, 2021, entitled "FOOT REST ASSEMBLY FOR SEAT OF A MOTORIZED VEHICLE," which claims the benefit of U.S. Provisional Patent Application Ser. No. 62/957,836, filed Jan. 7, 2020, entitled "FOOT REST ASSEMBLY FOR A SEAT OF A MOTORIZED VEHICLE," the disclosures of which are hereby incorporated by reference.

FIELD OF THE DISCLOSURE

The present disclosure relates to a motorized vehicle for transporting one or more passengers, and more particularly to a motorized vehicle capable of transporting one or more physically limited passengers with a seat having a foot rest assembly.

BACKGROUND

Automobile manufacturers do not currently mass-produce passenger vehicles specifically designed to transport passengers having physical limitations, either as a driver or as a non-driving passenger. Consequently, mass-produced passenger vehicles are modified, or retrofitted, by a number of aftermarket companies dedicated to supplying vehicles to physically limited passengers. Such vehicles can be modified by removing certain parts or structures within a vehicle and replacing those parts with parts specifically designed to accommodate the physically limited passenger. For example, in one configuration, a van may be retrofitted with a ramp to enable a physically limited individual using a wheelchair to enter the vehicle without the assistance of another individual.

Other known level change devices for retrofitting a vehicle, such as a van, include wheelchair lifts, lift platforms, and lowered floor surfaces. In some instances, a door of an original equipment manufacturer (OEM) van is enlarged or otherwise modified to permit entry of the physically limited individual through what is known as the assisted entrance. Once inside the vehicle, individuals who use the assisted entrance are often located in a rear passenger compartment of the vehicle adjacent to or behind the assisted entrance.

Many motorized vehicles modified to include a ramp or lift for transporting physically limited passengers are passenger vans or buses. Minivans, or passenger vans, are often referred to as multi-purpose vehicles (MPVs), people movers, or multi-utility vehicles. At least in the United States, minivans are classified as light trucks or MPVs. In many instances, these vans have rear access doors on each side thereof that, when opened, define a door opening that can provide easy ingress and egress of a wheelchair.

Crossover and sport-utility vehicles have become popular due to their style and driving performance. Sport-utility vehicles are built off a light-truck chassis similar to passenger vans, whereas crossover or crossover utility vehicles are built from a passenger car chassis. Due to their build, crossover vehicles are often more fuel efficient than heavier, sport-utility vehicles and include other advantages over minivans and sport-utility vehicles.

SUMMARY

In a first embodiment of the present disclosure, a foot rest assembly for a motorized vehicle includes a foot rest member movable between a first position and a second position; a first leg having a first leg end coupled to the foot rest member and a second leg end; a second leg having a first leg end coupled to the foot rest member and a second leg end; a first arm assembly comprising a flange and a first track, the first track having a first track end and a second track end; a second arm assembly comprising a flange and a second track, the second track having a first track end and a second track end; and a first bearing assembly coupled to the second leg end of the first leg and a second bearing assembly coupled to the second leg end of the second leg; wherein, the second leg end of the first leg is coupled to the first arm assembly, and the second leg end of the second leg is coupled to the second arm assembly; wherein, in the first position, the first bearing assembly and second bearing assembly are located at the first ends of the respective first and second tracks; wherein, in the second position, the first bearing assembly and second bearing assembly are located at the second ends of the respective first and second tracks.

In one example of this embodiment, in the first position, the foot rest member is disposed in a substantially horizontal plane; in the second position, the foot rest member is disposed in a substantially vertical plane. In a second example, the first leg and second leg are pivotally coupled to the first arm assembly and second arm assembly, respectively. In a third example, the foot rest member comprises a low-profile design.

In a fourth example, a pin is coupled to the foot rest member, the pin being removably coupled to a block affixed to the first or second arm assembly. In a fifth example, the pin is coupled to the block in the second position and decoupled therefrom in the first position. In a sixth example, the first and second bearing assemblies each comprise a roller for movably engaging the respective first and second track; a key member coupled to the roller and for coupling to the respective first or second leg; and a bearing element coupled between the roller and respective first or second leg. In another example, in the first position, the second ends of the first and second legs are positioned at the first ends of the respective first and second tracks; in the second position, the second ends of the first and second legs are positioned at the second ends of the respective first and second tracks.

In a further example, when moving from the first position to the second position the second ends of the first and second legs pivot about a first axis defined through the respective first and second bearing assemblies; and the second ends of the first and second legs move along a second axis defined by the first and second tracks. In yet a further example, the first axis is perpendicular to the second axis.

In another embodiment of the present disclosure, a foot rest assembly includes a foot rest member movable between a stowed position and a deployed position; a leg having a first leg end coupled to the foot rest member and a second leg end; an arm assembly comprising a flange and a track, the track including a first track end and a second track end; and a bearing assembly coupled to the second leg end of the leg; wherein, in the deployed position, the bearing assembly and second leg end are located at the first end of the track; wherein, in the stowed position, the bearing assembly and second leg end are located at the second end of the track.

In one example of this embodiment, in the first position, the foot rest member is disposed in a substantially horizontal plane; in the second position, the foot rest member is disposed in a substantially vertical plane. In a second example, the leg is pivotally coupled to the arm assembly. In another example, a pin is coupled to the foot rest member, the pin being removably coupled to a block affixed to the arm assembly. In yet another example, in the first position, the second end of the leg is positioned at the first end of the track; in the second position, the second end of the leg is positioned at the second end of the track.

In a further embodiment of the present disclosure, a transport vehicle for transporting a wheelchaired passenger includes a chassis; a plurality of wheels for supporting the chassis; an interior space comprising a front compartment and a rear compartment, the front compartment being sized for at least a front seat and the rear compartment being sized for a rear seat; a vehicle floor, a rear wall and opposing side walls located in the rear compartment; a foot rest assembly coupled to the rear seat, the foot rest assembly comprising a foot rest member movable between a stowed position and a deployed position; a leg having a first leg end coupled to the foot rest member and a second leg end; an arm assembly comprising a flange and a track, the track including a first track end and a second track end; and a bearing assembly coupled to the second leg end of the leg, the bearing assembly disposed at least partially within the track; wherein, in the deployed position, the bearing assembly and second leg end are located at the first end of the track; wherein, in the stowed position, the bearing assembly and second leg end are located at the second end of the track.

In one example of this embodiment, the foot rest assembly is coupled directly to the rear seat. In another example, the leg is positioned below the rear seat in the stowed and deployed positions. In a further example, the foot rest member is in contact with the rear seat in the stowed position. In yet a further example, the leg is positioned below the seat in the stowed position.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
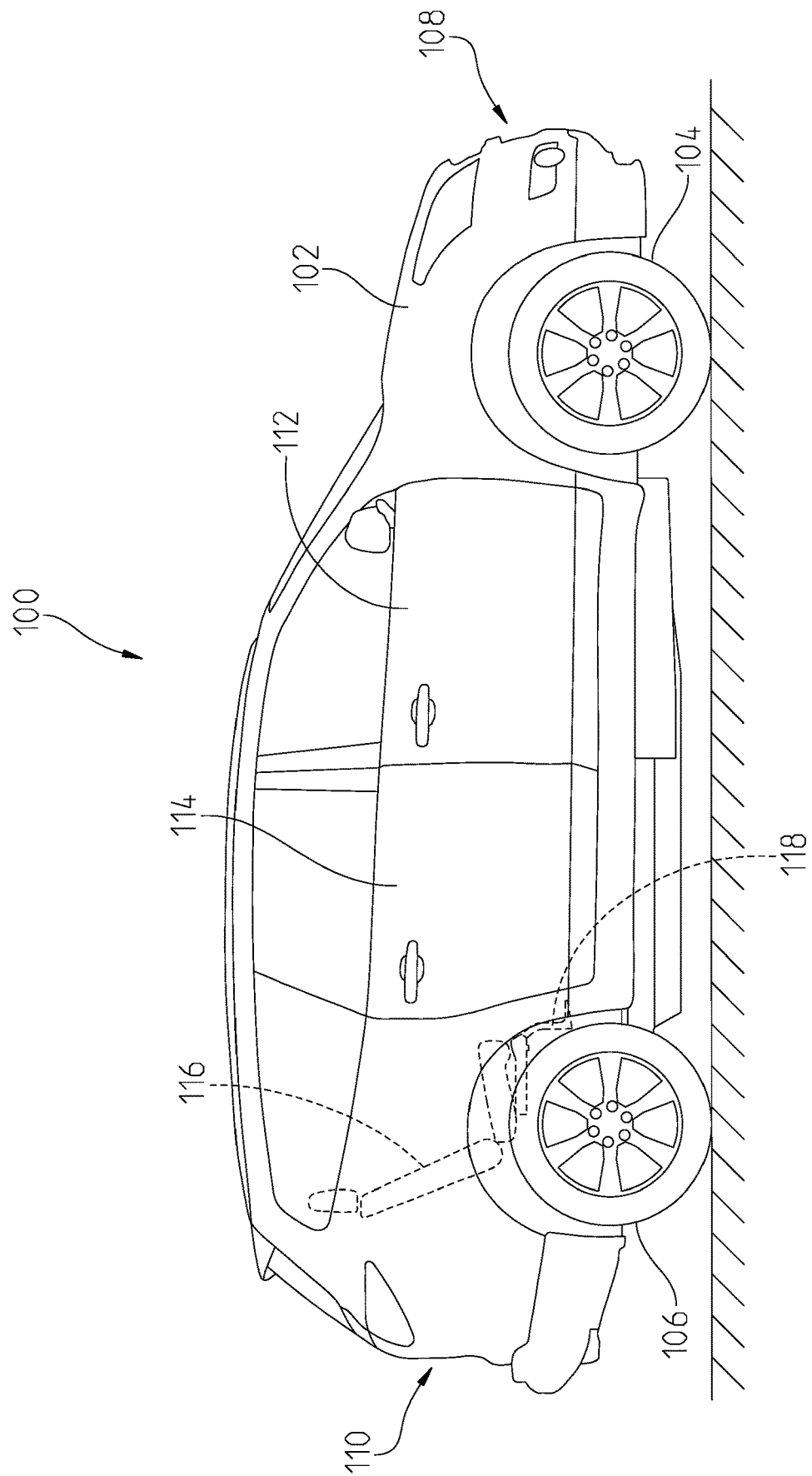
FIG. 1 is a side view of a motorized vehicle.

FIG. 1 illustrates an embodiment of a sport-utility vehicle (SUV) or crossover vehicle (CV) 100 available from any number of United States and foreign manufacturers. In one example, the vehicle is a Chevrolet® Traverse. In the illustrated embodiment, the vehicle 100 may a unibody construction. Other SUVs or crossover vehicles contemplated within this disclosure may include a frame on body construction. Consequently, the use of SUV herein includes all types and kinds of sport utility vehicles constructed with a body on frame construction, a unibody construction, or other constructions.

As shown in FIG. 1, the vehicle 100 may include a vehicle body or chassis 102 operatively coupled to front wheels 104 and rear wheels 106 which support the vehicle 100 as it traverses the ground. The vehicle 100 may include a unibody construction designed off of a truck chassis. The vehicle body 102 may also define a body or vehicle axis through the center of the vehicle 100. The body axis may be defined along the length of the vehicle 100. The vehicle may be designed to have a gross vehicle weight of at least 6000 pounds. In another aspect, the rating may be at least 8000 pounds but less than approximately 10000 pounds. In a further aspect, the rating may be between approximately 6000 and 10000 pounds.

As shown, the vehicle 100 includes a front end 108 and a rear end 110. A conventional driver's seat and front passenger seat (not shown) are generally located towards the front end 108 of the vehicle 100, whereas a rear passenger seat 116 is generally located towards the rear end 110 of the vehicle. The rear passenger seat 116 is located generally behind the driver's seat and front passenger seat. The rear passenger seat 116 may include a foot rest 118, which will be described in further detail below.

The vehicle 100 may include a first or front passenger side door 112 located between the front wheels 104 and rear wheels 106 and provides access to a passenger for sitting in a front seat (not shown) of the vehicle 100 adjacent to the driver. In this position, the passenger has a clearer forward view of the road when compared to sitting in the rear passenger seat 116 of the vehicle 100. Moreover, when seated, the passenger may be facing in a forward direction of travel. Further, in its conventional arrangement, the vehicle 100 of FIG. 1 may include a second passenger side door 114 coupled to the unibody frame.

In at least some crossover vehicles such as the one depicted in FIG. 1, a bench-style seat or three individual seats may be arranged at a location rearward of the driver's seat and front passenger's seat. These rear seat options allow for more passengers to ride in the vehicle. When modifying this type of vehicle, however, for a passenger entering the vehicle via a wheelchair, it is necessary to have as much floor space as possible for wheelchair user. This is particularly important for the user to be able to enter the rear portion of the vehicle and turn the wheelchair around to face forward. Most conventional OEM vehicles lack adequate floor space to allow a wheelchair user to turn the wheelchair around. When floor space is increased, conventional foot rests obstruct the additional space that a wheelchair user would otherwise use to pivot or rotate the wheelchair to face forward.

Figure 2:
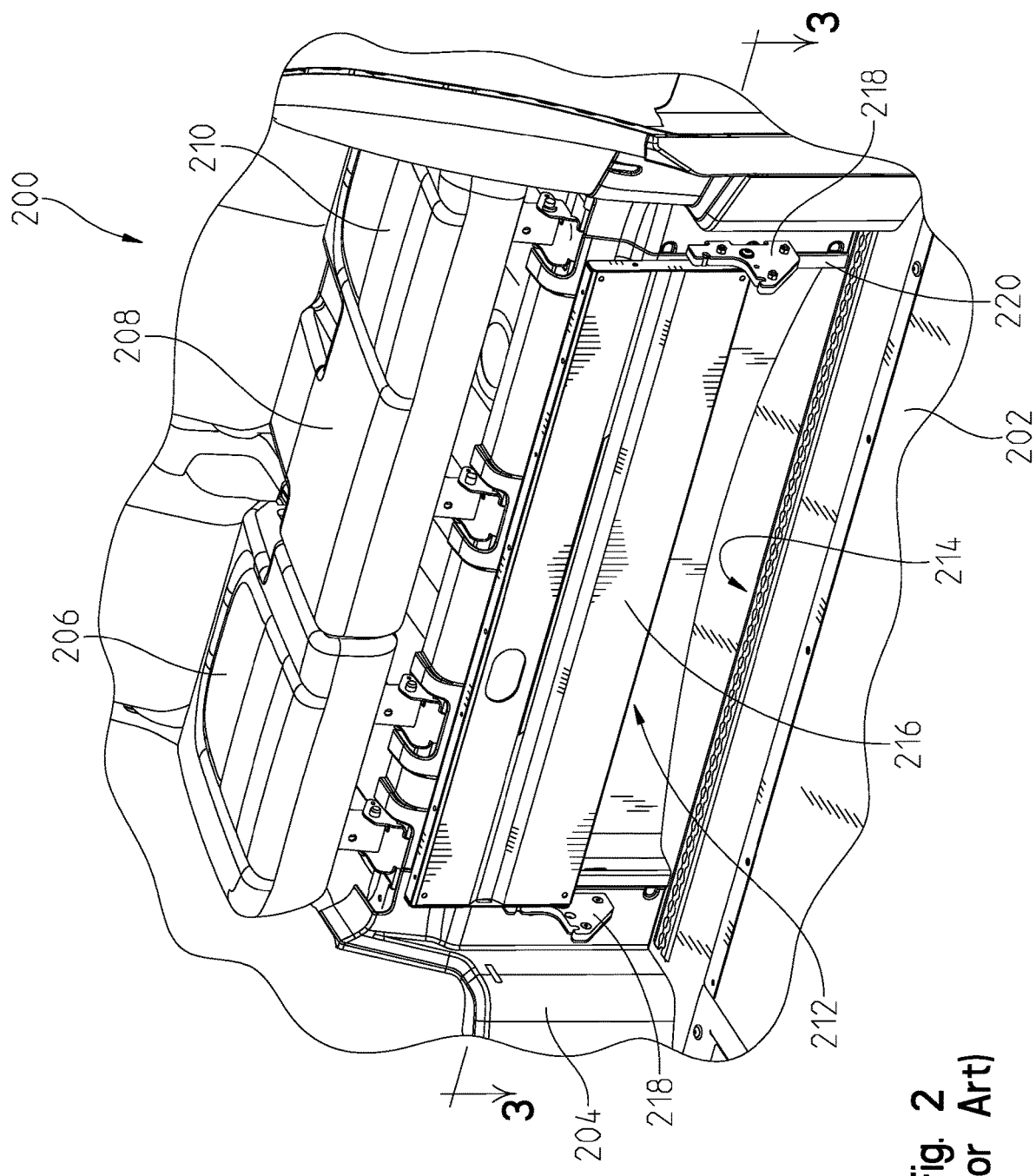
FIG. 2 is an interior perspective view of a motorized vehicle with a back seat and conventional foot rest assembly.
Figure 3:
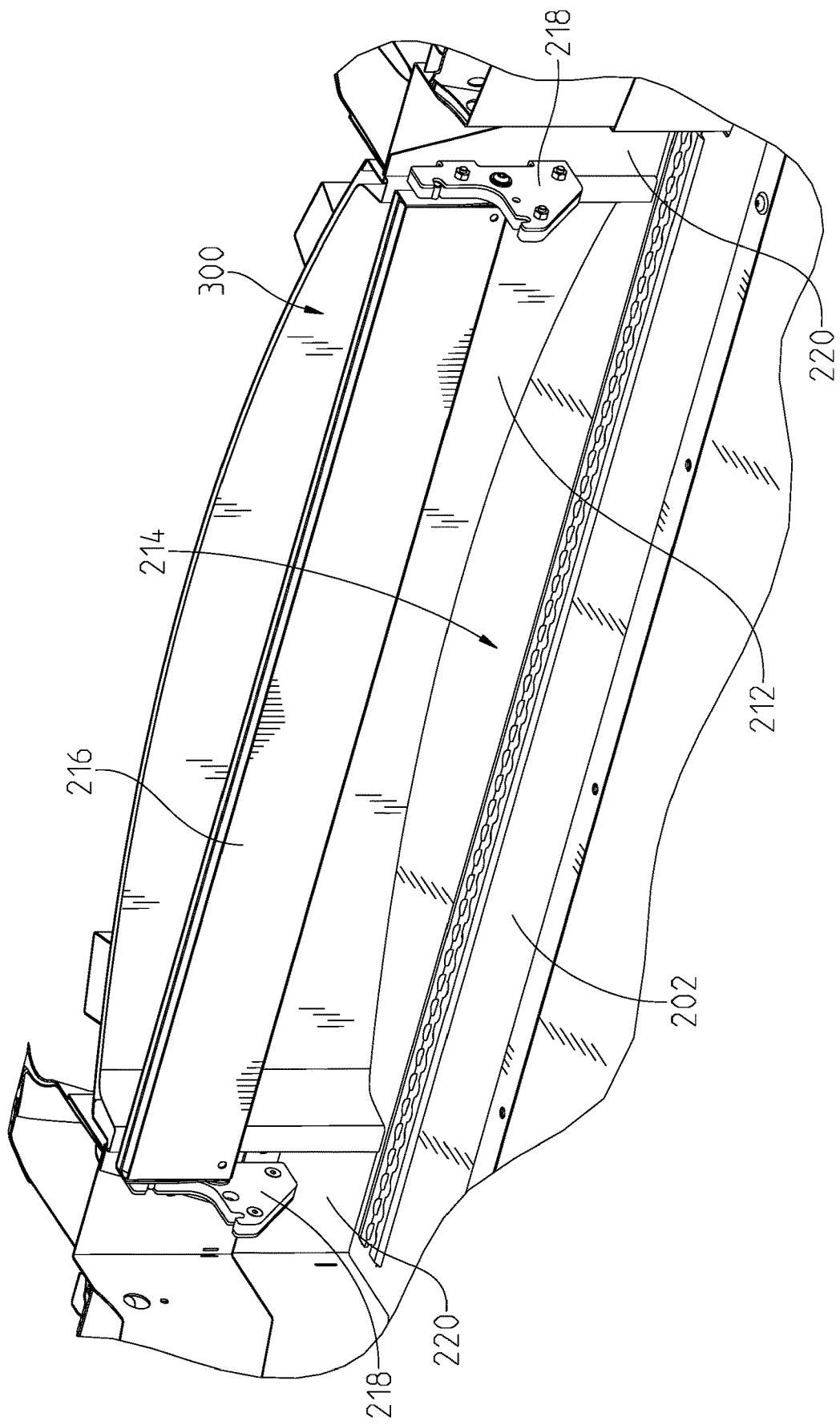
FIG. 3 is another partial perspective view of the conventional foot rest assembly of FIG. 2.

Turning to FIGS. 2 and 3, for example, a portion of a rear interior portion 200 of a motorized vehicle is shown. Here, the rear interior portion 200 is partially defined by a vehicle floor 202 and opposing side walls 204. A seat arrangement may be positioned in the rear compartment 200 such that the arrangement includes a first seat 206, a second seat 208, and a third seat 210. The seats may be individual seats or formed as a single rear bench seat. The seat arrangement may be located slightly rearward of a rear wall structure 212 that bows rearward to define a substantially semicircular area of additional floor space 214. This additional floor space 214 may be utilized by a user in a wheelchair to turn or pivot the wheelchair in the rear interior portion. Without the additional floor space 214, the area between the driver's seat (not shown), front passenger seat (not shown), and the rear seat arrangement may be too small for a wheelchair upon entering the rear interior portion 200 to be pivoted or rotated to face the forward traveling direction.

The rear seat arrangement may also include a conventional foot rest 216, as shown in FIGS. 2 and 3. The foot rest 216 is shown in its stowed position in FIG. 2 and its deployed position in FIG. 3. The foot rest 216 may pivot about a hinge 218 on each side thereof to allow the foot rest 216 to move between its two positions. The hinge 218, and thus the foot rest 216, is mounted to a rear wall support 220 and the floor 202. Movement of the foot rest 216 is restricted to pivotal movement about the hinge 218.

The conventional foot rest 216 provides adequate support to a seated passenger when the user is seated in one of the seats of the seat arrangement. However, even in its stowed position (FIG. 2), the foot rest 216 protrudes forwardly from the seat arrangement and occupies a significant portion, if not all, of the additional floor space 214 needed by the wheelchair user to pivot or turn the wheelchair in the rear interior portion 200 (see FIG. 10). Moreover, the foot rest 216 occupies all of the additional floor space 214 when it is in its deployed position (see FIG. 11). Thus, there is little space for the wheelchair user to enter the rear interior portion 200 via a ramp or lift (not shown), and then pivot or rotate the wheelchair in order to be facing in the forward travel direction. This is a significant disadvantage associated with conventional rear seat arrangements and corresponding foot rests such as those provided by OEMs. A need therefore exists for modifying the rear seat arrangement or foot rest to allow for the use of these additional floor space by a wheelchair user when entering the rear interior portion of the vehicle.

Figure 4:
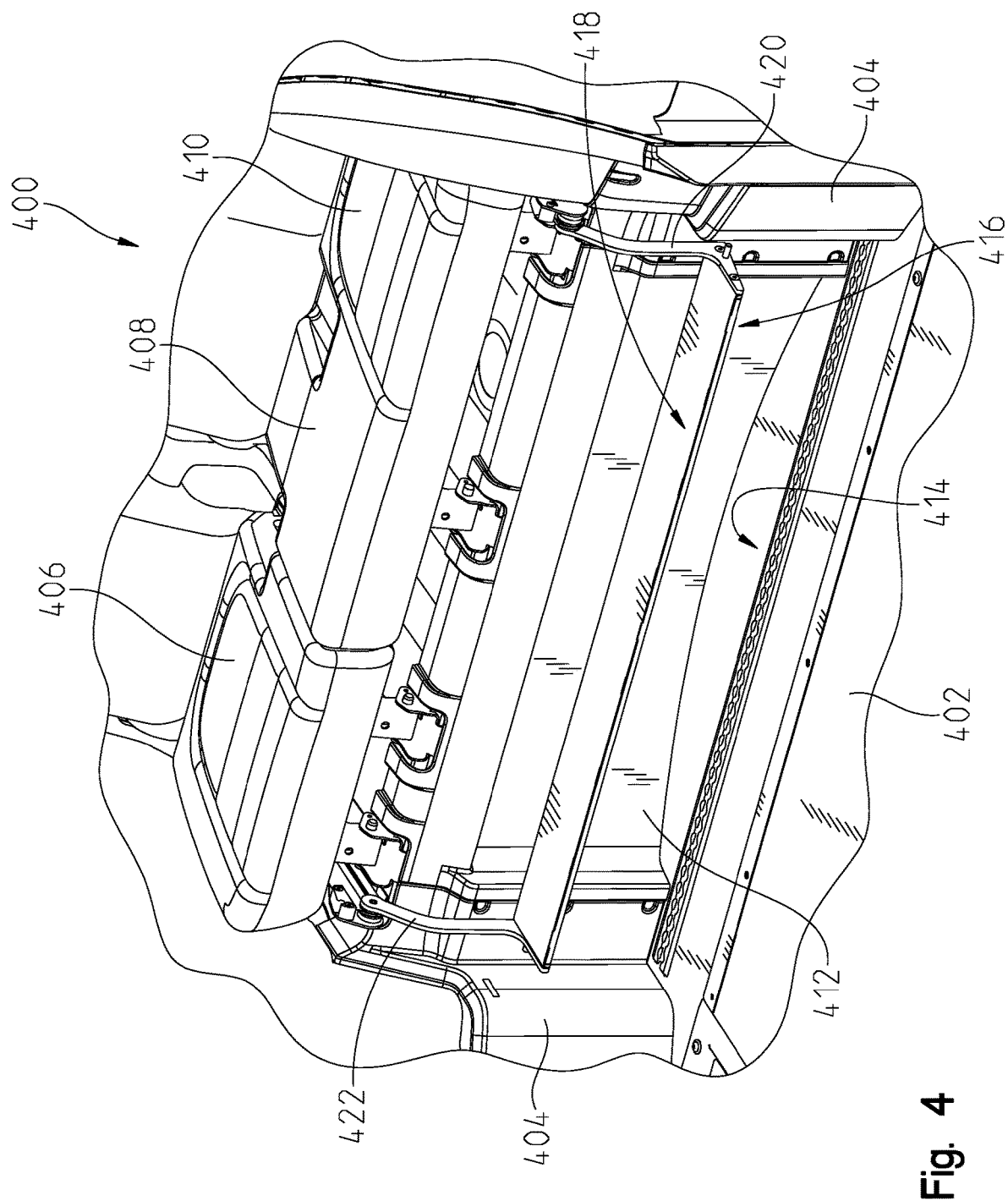
FIG. 4 is a perspective view of an interior of a motorized vehicle with a back seat and a foot rest assembly in a deployed position.

Referring to FIG. 4, a rear interior portion 400 of a motorized vehicle is shown. Similar to the embodiment of FIG. 2, the rear interior portion 400 may be located rearward of a driver's seat and front passenger seat (not shown) of the vehicle. The rear interior portion 400 may include a plurality of individual seats or a bench. In FIG. 4, a first seat 406, a second seat 408, and a third seat 410 are shown. In some embodiments, only the first seat 406 and third seat 410 may be provided, with a space provided therebetween. In another embodiment, the first, second and third seats may form a single bench. Other seating arrangements may be used as known to one skilled in the art.

The rear interior portion 400 may be partially defined by a vehicle floor 402 and opposing side walls 404 of the vehicle. The seats may be located above a rear wall 412 that is concave-like and defines a semi-circular-shaped floor space 414 that may be used by a wheelchair user to pivot or rotate the wheelchair upon ingress. While most OEM vehicles may not include this concave-like rear wall 412, the additional floor space assists the wheelchair user and increases the area between the front passenger and driver seats and the rear seats 406, 408, 410.

Figure 5:
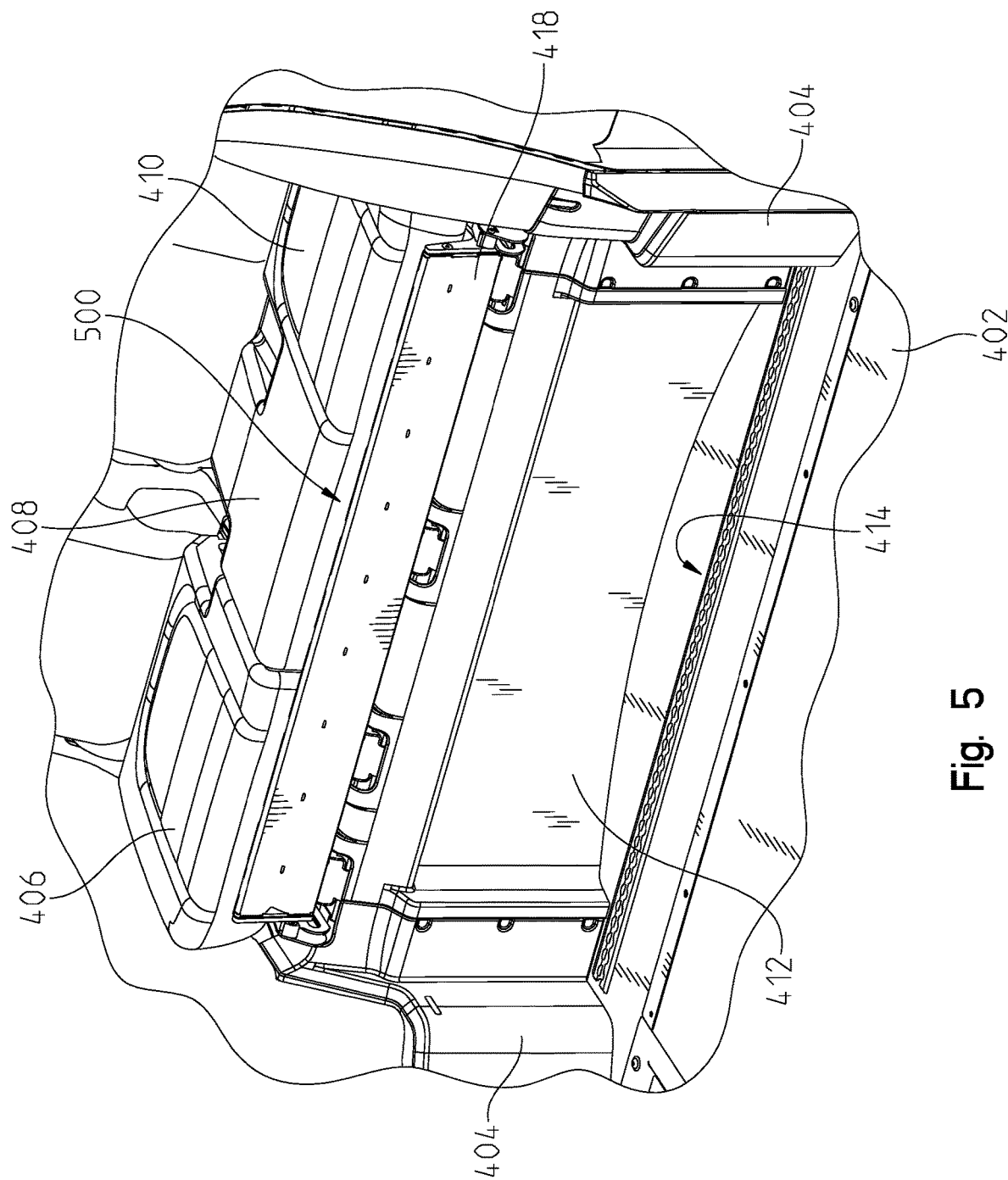
FIG. 5 is another perspective view of the foot rest assembly of FIG. 4 in its stowed position.

The rear seat arrangement in FIG. 4 may also include a foot rest assembly 416 shown in its deployed position. The foot rest assembly 416 may include a foot rest member 418 coupled between a first leg 420 and a second leg 422. The foot rest assembly 416 may be moved between its deployed position of FIG. 4 and a stowed position 500 of FIG. 5. In the deployed position, the foot rest member 418 is defined a long a substantially horizontal plane shown in FIG. 4. In the stowed position 500, however, the foot rest member 418 may be oriented in a substantially vertical position as shown in FIG. 5. The foot rest member 418 may therefore move or pivot approximately 90° between its deployed and stowed positions.

In the stowed position 500, the foot rest assembly 416 may be positioned such that it is at least partially, if not completely, disposed in contact with the seat arrangement. In other words, the foot rest assembly 416 may be tucked against cushions of the first seat 406, second seat 408, and third seat 410 of the seat arrangement. The first leg 420 and second leg 422 are located below the seats thereby allowing the foot rest assembly 416 to move as far rearward as possible in the stowed position. Due to this positioning, the additional floor space 414 offered by the concave-like rear wall 412 is free and available for the wheelchair user to maneuver the wheelchair when it is located in the rear interior portion 400 of the vehicle.

The foot rest assembly 416 of FIG. 4 comprises a low-profile design that is coupled to the seat arrangement, rather than the floor as the conventional foot rest is mounted. This allows the foot rest assembly 416 to be stowed further rearward than the conventional foot rest of FIGS. 2 and 3, and therefore removes the foot rest assembly 416 from occupying the additional floor space 414.

Figure 10:
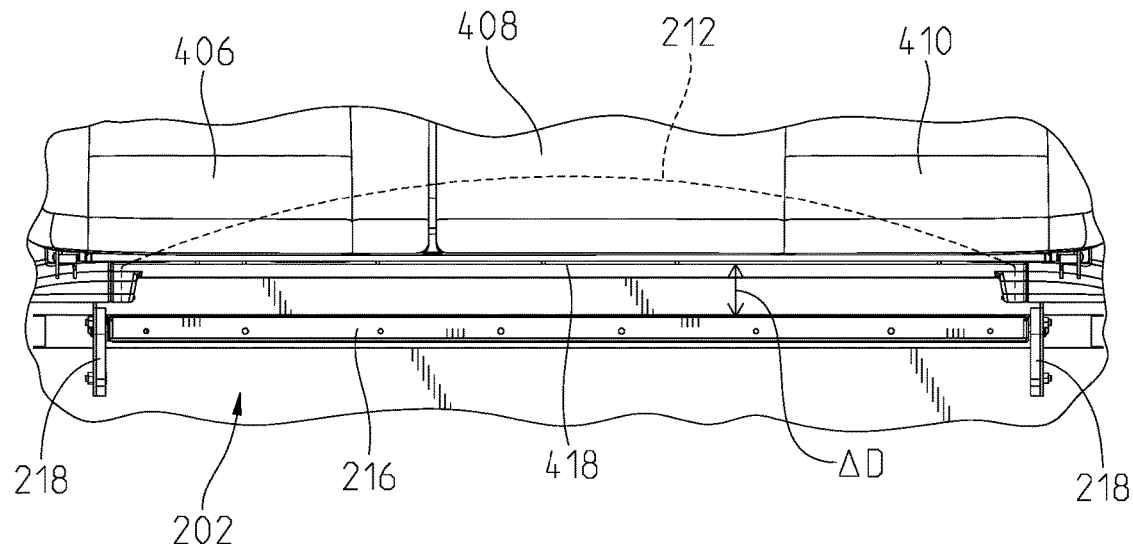
FIG. 10 is a partial top view of the foot rest assembly of FIG. 2 and the foot rest assembly of FIG. 4 in their stowed positions.
Figure 11:
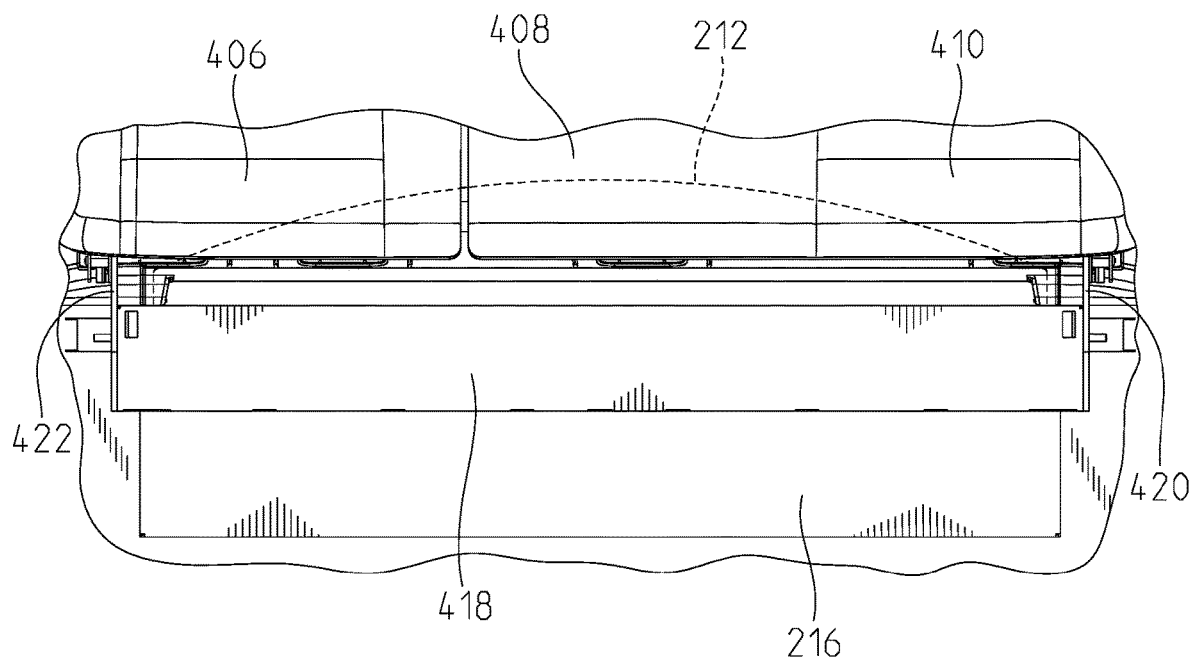
FIG. 11 is a partial top view of the foot rest assembly of FIG. 2 and the foot rest assembly of FIG. 4 in their deployed positions.

Turning to FIGS. 10 and 11, the differences between the conventional foot rest assembly 216 of FIG. 2 and the foot rest assembly 416 of FIG. 4 is shown relative to the seat arrangement (i.e., seats 406, 408, and 410) and the semicircular-shaped rear wall structure 212 (in broken lines). As shown in FIG. 10, both foot rest assemblies are illustrated in their stowed positions. In the stowed position, the foot rest assembly 418 of FIG. 4 is located rearward of the conventional foot rest assembly 216 by a distance, ΔD. Moreover, the foot rest assembly 418 is located more closely to the rear wall structure 212, thereby allowing for greater floor space 414 available to maneuver a wheelchair in a rear portion of a motorized vehicle 100.

In FIG. 11, the foot rest assembly 418 and conventional foot rest assembly 216 are shown in their deployed positions. The lower profile foot rest assembly 418 does not protrude forwardly as far as the conventional foot rest assembly 216, thereby providing additional foot room and floor space in the rear seat compartment 400 of the vehicle.

Figure 6:
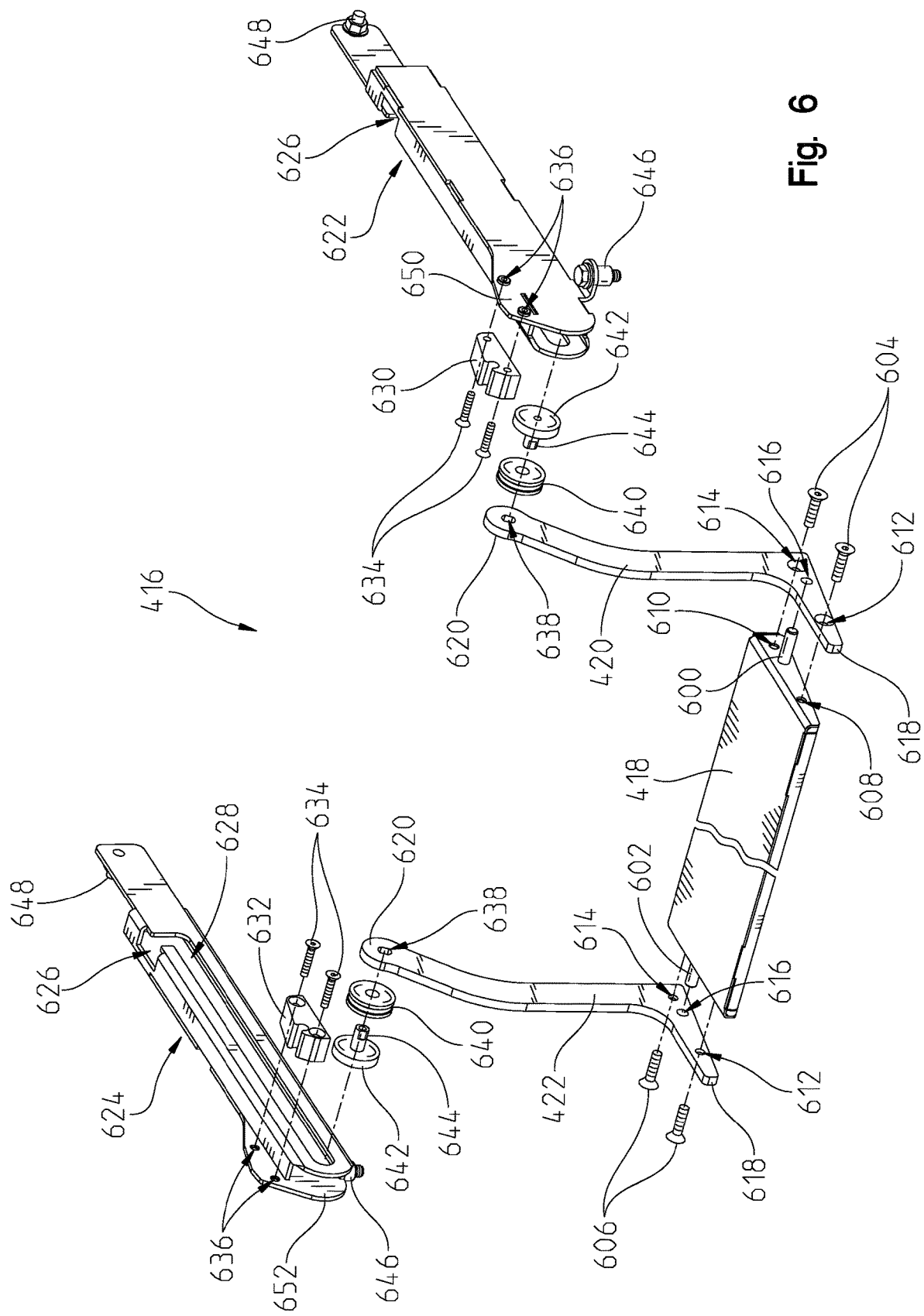
FIG. 6 is an exploded view of the foot rest assembly of FIG. 4.
Figure 7:
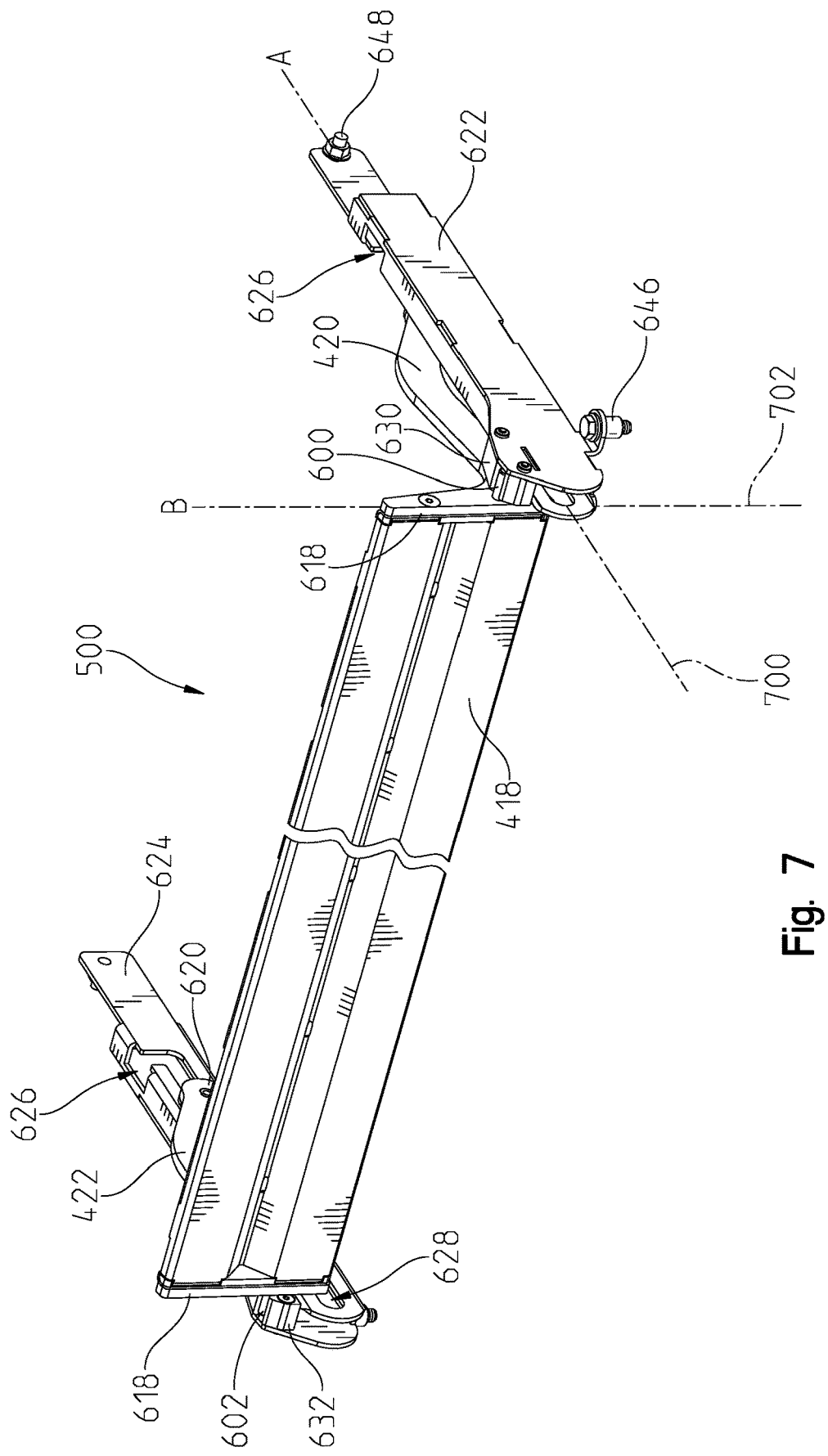
FIG. 7 is a perspective view of the foot rest assembly of FIG. 4 only in its stowed position.

In FIGS. 6 and 7, the foot rest assembly 416 is illustrated to better understand its individual parts and how it functions. The foot rest member 418 comprises a substantially rectangular body defining an upper surface available for a foot of a passenger seated on the rear seat arrangement to be rested upon. The foot rest member 418 may include a plurality of openings for receiving fasteners 604 when coupled to the first leg 420 and second leg 422. For example, the foot rest member 418 may include a first opening 608 and a second opening 610 on each side thereof. The first opening 608 in the foot rest member 418 may be aligned with a first opening 612 in the first leg 420, and the second opening 610 in the foot rest member 418 may be aligned with a second opening 614 of the first leg 420. The second leg 422 also includes the first opening 612 and second opening 614, which are aligned with corresponding openings in the foot rest member 418. Fasteners 604 and 606, such as screws or bolts, may be used to couple the first leg 420 and second leg 422, respectively, to the opposite ends of the foot rest member 418.

The first leg 420 and second leg 422 may also include a third opening 616 defined between the respective first opening 612 and second opening 614. The third opening 616 in the first leg 420 is configured to receive a first pin 600 and the third opening 616 in the second leg 422 is configured to receive a second pin 602. The first and second pins may be disposed within slots in the stowed position, as will be described in further detail with respect to FIG. 8 below.

The first leg 420 and second leg 422 may include a first end 618 and an opposite second end 620. At the first end 618, the first and second legs are coupled to the foot rest member 418. At the second end 620 thereof, the first and second legs each include a defined key slot opening 638. The key slot openings will be described further below.

Figure 9:
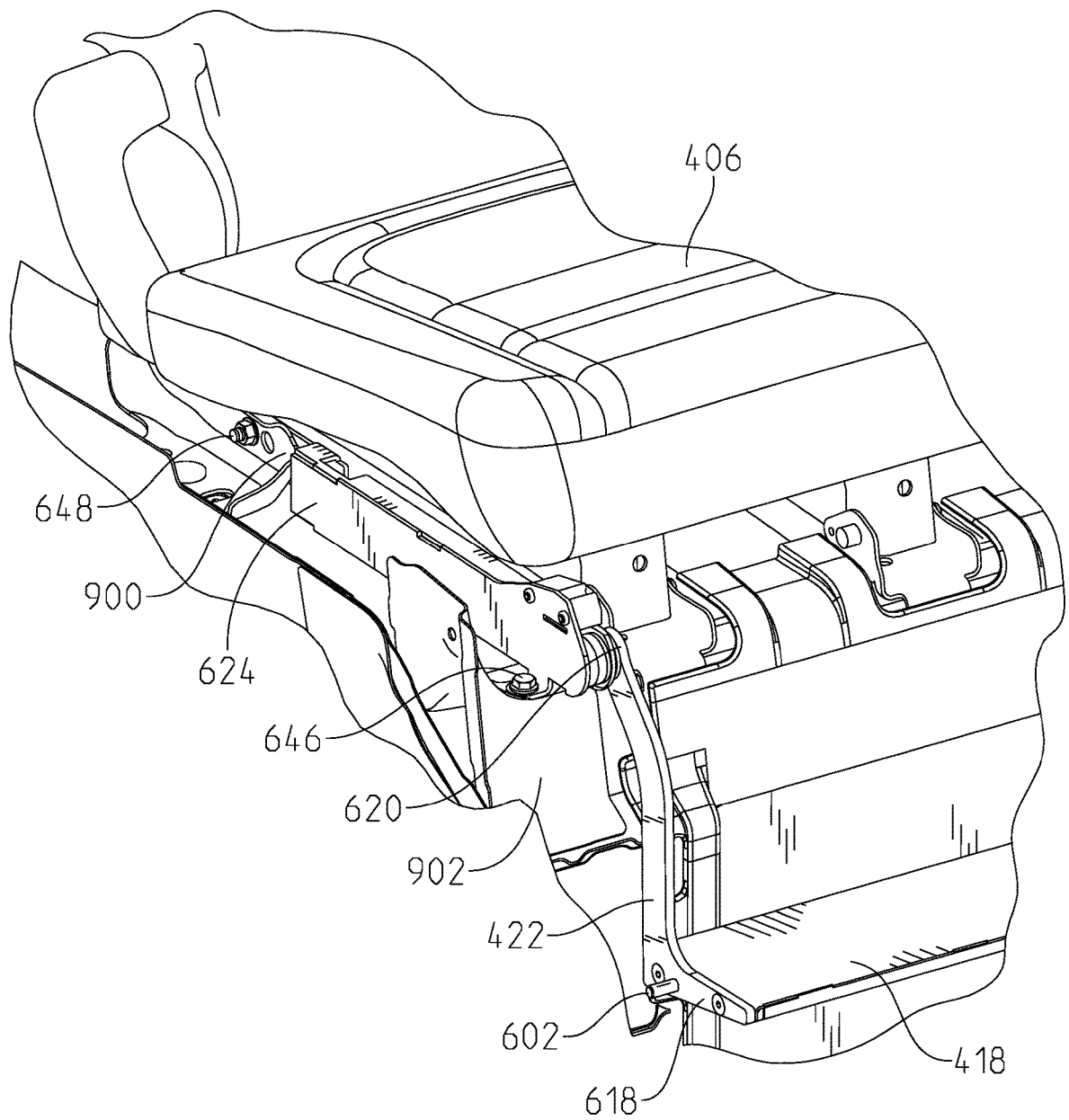
FIG. 9 is a partial side perspective view of a back seat and the foot rest assembly of FIG. 4 in its deployed position.

The foot rest assembly 416 may include a first arm assembly 622 and a second arm assembly 624. The first and second arm assemblies may be formed as mounting rails with tracks or rails along which the first and second legs slide between the stowed and deployed positions, as described in further detail below. In any event, the first arm assembly 622 and second arm assembly 624 may be integrated into the seat base structure 900 (see FIG. 9). In one embodiment, each arm assembly may be coupled to outboard seat risers 902 via one or more bolts 646, 648 or fasteners.

The first arm assembly 622 and second arm assembly 624 may also function to house or partially enclose a slide bearing assembly which allows the foot rest member 418 to be moved between its stowed position 500 and deployed position. The slide bearing assembly may include a bearing element 640 and a roller 642. The roller 642 may include a key member 644 which protrudes therefrom and may engage within the key slot opening 638 of the first and second legs. In this way, the first and second legs 420, 422 may be movably coupled to the first and second arm assemblies. The combination of these components form the kinematic mechanism which allows the foot rest assembly 416 to move between its stowed position and deployed position.

For sake of this disclosure, the stowed position may be a first position and the deployed position may be a second position, and the foot rest assembly 416 may be moved to any position therebetween. Thus, the foot rest assembly 416 may take one of a plurality of positions between the stowed and deployed positions.

The first arm assembly 622 may include a first flange portion 650 and the second arm assembly 624 may include a second flange portion 652, as shown in FIG. 6. A first block 630 may be coupled to the first flange portion 650 via one or more fasteners 634, whereas a second block 632 may be coupled to the second flange portion 652 via one or more fasteners 634. The first flange portion 650 may include one or more openings 636 through which the one or more fasteners 634 are positioned for coupling the first block 630 to the first flange portion 650. Likewise, the second flange portion 652 may include one or more openings 636 through which the one or more fasteners 634 are positioned for coupling the second block 632 to the second flange portion 652.

The first arm assembly 622 and second arm assembly 624 may each include an opening 626 defined at one end thereof. The opening 626 may be part of a track 628 along which the slide bearing assembly moves. For example, the roller 642 may slide or roll along the track 628 as the foot rest assembly 416 is moved between the deployed and stowed positions.

In the embodiment of FIG. 7, the foot rest member 418 is shown in its stowed position 500. Here, first arm member 622 is oriented along a first axis 700. Moreover, the foot rest member 418 and first end 618 of the first leg 420 are defined along a second axis 702. The first axis 700 and second axis 702 may be angled relative to one another. In one non-limiting example, the first axis 700 and second axis 702 may be angled by 60° or more relative to one another. In a second non-limiting example, the first and second axes may be angled by 75° or more relative to one another. In another non-limiting example, the first and second axes may be approximately perpendicular to one another.

Figure 8:
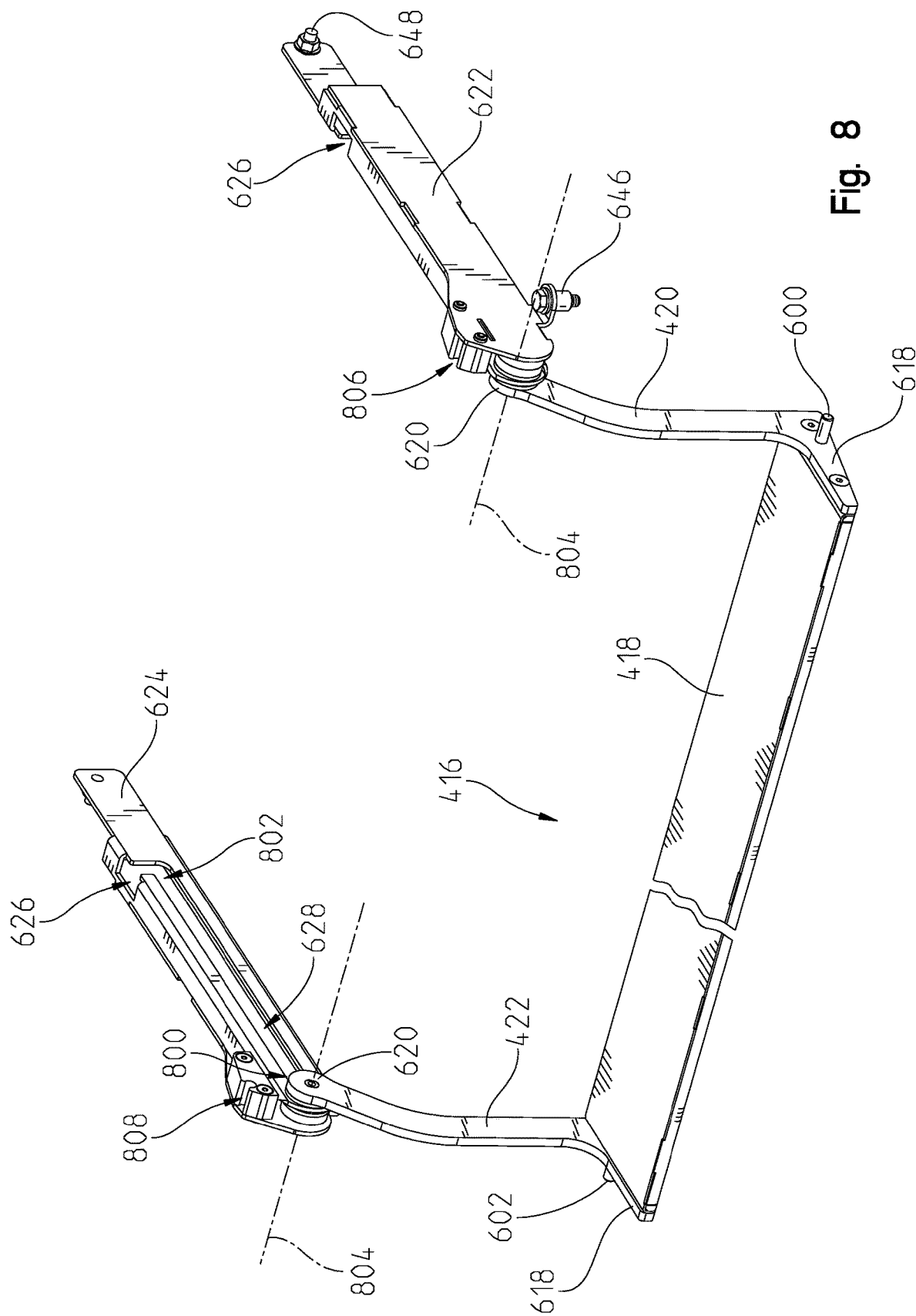
FIG. 8 is a perspective view of the foot rest assembly of FIG. 4 only in its deployed position.

Referring to FIG. 8, the foot rest assembly 416 is illustrated in its deployed position. Here, the track 628 of the first and second arm assemblies is best shown. The track 628 may include a first end 800 and a second end 802. In the deployed position of FIG. 8, the second end 620 of each leg, and thus the slide bearing assembly, is located at the first end 800 of the track 628. In the stowed position 500, however, the second end 620 of each leg, and thus the corresponding slide bearing assembly, is located at the second end 802 of the track 628. As such, the second end 620 of each leg and the corresponding slide bearing assembly move in a substantially translational direction along the first axis 700 (and a corresponding parallel axis of the second arm assembly 624) between the first and second ends of the track 628.

During assembly, a portion of the slide bearing assembly including the roller 642 is located within the track 628 by inserting it through the opening 626 of the arm assembly. In one example, the roller 642 is located within the track 628. In another example, the roller 642 and the bearing element 640 are located within the track 628.

The connection between the first leg 420 and the slide bearing assembly defines a pivot axis 804, as shown in FIG. 8. The pivot axis 804 passes through a pivotal connection between the first leg 420 and slide bearing assembly, and also through a pivotal connection between the second leg 422 and the corresponding slide bearing assembly. Thus, the first and second legs may pivot relative to the slide bearing assembly and the first and second arm assemblies. In other words, the first leg 420 may pivot relative to the first arm assembly 622, whereas the second leg 422 may pivot relative to the second arm assembly 624. This pivotal movement allows the foot rest assembly 416 to move between its deployed and stowed positions.

As also shown in FIG. 8, the first block 630 may include a first slot 806, and the second block 632 may include a second slot 808. As best shown in FIG. 7, the first pin 600 is configured to be received by the first slot 806 and the second pin 602 is configured to be received by the second slot 808 in the stowed position 500. The engagement between the pin and slot may be snap-fit connection to better retain the foot rest assembly 416 in its stowed position. As described previously, the first and second blocks may be coupled to a top portion or flange of the respective arm assembly. When engaged, the blocks are able to retain the pins in a substantially tight, rattle-free manner.

When the foot rest assembly 416 is in its stowed position, it may be moved to its deployed position by pulling the foot rest member 418 forward and away from the rear seat arrangement. As this is done, the slide bearing assemblies on each side of the foot rest assembly 416 may travel along the tracks (or slots) defined by the first and second arm assembly. As the slide bearing assemblies reach the first end 800 of the respective arm assembly, the first leg 420 and second leg 422 may pivot about the pivotal connection and pivot axis 804 into the deployed position of FIG. 8. Thus, the foot rest assembly 416 moves in a first translational movement from its stowed position and then pivoted downwardly to the deployed position.

When moving from the deployed position to the stowed position, the reverse is true. The foot rest member and first and second legs are first pivoted about pivot axis 804 until the second end 618 of each leg is substantially aligned with the first end 620 and the track 628 along the first axis 700. Once aligned, the slide bearing assemblies may be slid along with the first leg 420, second leg 422, and foot rest member 418 in a substantially linear (translational) rearward direction (along axis 700) to the stowed position 500 until the top surface of the foot rest member 418 is in contact with or in near contact with the cushions of the rear seat arrangement. Moreover, the first pin 600 and second pin 602 are positioned within the first slot 806 and second slot 808, respectively, in a snap-fit or other locking manner with the first and second blocks 630, 632. In this way, the foot rest assembly 416 is retained in its stowed position 500.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A foot rest assembly for a motorized vehicle, comprising:
   a foot rest member movable between a deployed position and a stowed position;
   at least one leg having a first leg end coupled to the foot rest member and a second leg end; and,
   at least one flange for connection to the vehicle;
   wherein:
      the second leg end of the at least one leg is pivotally coupled to the at least one flange for rotating the foot rest member relative to the at least one flange;
      in the deployed position, the foot rest member is disposed in a substantially horizontal plane below the at least one flange;
      in the stowed position, the foot rest member is disposed in a substantially vertical plane and upwardly extending relative to the flange.

2. The foot rest assembly of claim 1 further comprising at least one bearing assembly coupled to the second leg end of the at least one leg, wherein:
   the at least one flange comprises a track having a first track end and a second track end; and,
   in the deployed position, the at least one bearing assembly is located at the first track end;
   in the stowed position, the at least one bearing assembly is located at the second track end.

3. The foot rest assembly of claim 1, wherein in the stowed position, the at least one leg is substantially horizontal.

4. The foot rest assembly of claim 1, further comprising a locking member coupled to the foot rest member, the locking member being removably coupled to the at least one flange.

5. The foot rest assembly of claim 4, wherein the locking member is coupled to the at least one flange in the stowed position and decoupled therefrom in the deployed position.

6. The foot rest assembly of claim 2, wherein the at least one bearing assembly comprises:
   a roller for movably engaging the track;
   a key member coupled to the roller and for coupling to the at least one leg; and
   a bearing element coupled between the roller and the at least one leg.

7. The foot rest assembly of claim 2, wherein:
   in the deployed position, the second end of the at least one leg is positioned at the first end of the track;
   in the stowed position, the second end of the at least one leg is positioned at the second end of the track.

8. The foot rest assembly of claim 2, wherein when moving from the deployed position to the stowed position:
   the second end of the at least one leg pivots about a first axis defined through the at least one bearing assembly; and
   the second end of the at least one leg moves along a second axis defined by the track.

9. The foot rest assembly of claim 8, wherein the first axis is perpendicular to the second axis.

10. A foot rest assembly, comprising:
    a foot rest member movable between a stowed position and a deployed position;
    a leg having a first leg end coupled to the foot rest member and a second leg end;
    an arm assembly comprising a flange and a track, the track including a first track end and a second track end;
    a bearing assembly coupled to the second leg end of the leg; and
    a locking member coupled to the foot rest member, the locking member being removably coupled to the arm assembly;
    wherein, in the deployed position, the bearing assembly and second leg end are located at the first end of the track;
    wherein, in the stowed position, the leg is disposed substantially parallel to the track with the bearing assembly and second leg end located at the second end of the track and the first leg end located adjacent the first end of the track.

11. The foot rest assembly of claim 10, wherein:
    in the deployed position, the foot rest member is disposed in a substantially horizontal plane;
    in the stowed position, the foot rest member is disposed in a substantially vertical plane.

12. The foot rest assembly of claim 10, wherein the leg is pivotally coupled to the arm assembly.

13. A transport vehicle for transporting a wheelchaired passenger, comprising:
    a chassis;
    a plurality of wheels for supporting the chassis;
    an interior space comprising a front compartment and a rear compartment, the front compartment being sized for at least a front seat and the rear compartment being sized for a rear seat;

a vehicle floor, a rear wall and opposing side walls located in the rear compartment;

a foot rest assembly coupled to the rear seat, the foot rest assembly comprising:

a foot rest member movable between a stowed position and a deployed position;

wherein, in the deployed position, the foot rest member is disposed in a substantially horizontal plane below a seat bottom of the rear seat with a top surface generally parallel to the vehicle floor;

wherein, in the stowed position, the foot rest member is disposed in a substantially vertical plane with the top surface in at least near contact with the seat bottom.

14. The foot rest assembly of claim 2, wherein in the deployed position, the at least one leg is substantially vertical.

15. The foot rest assembly of claim 11, wherein:

in the deployed position, the foot rest member is disposed below the track; and, in the stowed position, the foot rest member is upwardly extending relative to the track.

16. The vehicle of claim 13 wherein the foot rest assembly further comprises:

a leg having a first leg end coupled to the foot rest member and a second leg end;

a flange coupling the foot rest assembly to the rear seat;

the second leg end of the leg is pivotably coupled to the flange for rotating the foot rest member relative to the flange;

in the deployed position, the foot rest member is disposed below the flange; and, in the stowed position, the foot rest member is upwardly extending relative to the flange.

17. The vehicle of claim 13 wherein the foot rest assembly further comprises:

a leg having a first leg end coupled to the foot rest member and a second leg end;

an arm assembly comprising a flange and a track, the track including a first track end and a second track end; and a bearing assembly coupled to the second leg end of the leg;

wherein, in the deployed position, the bearing assembly and second leg end are located at the first end of the track;

wherein, in the stowed position, the leg is disposed substantially parallel to the track with the bearing assembly and second leg end located at the second end of the track and the first leg end located adjacent the first end of the track.

18. The foot rest assembly of claim 17, wherein:

in the deployed position, the foot rest member is disposed below the track; and, in the stowed position, the foot rest member is upwardly extending relative to the track.

19. The foot rest assembly of claim 17, wherein the second leg end of the leg is pivotably coupled to the bearing assembly for rotating the foot rest member relative to the arm assembly.

* * * * *